May 18, 1926.  
R. M. LOVEJOY  
1,584,957  
SHOCK ABSORBER ARM AND CONNECTION  
Filed June 5, 1922
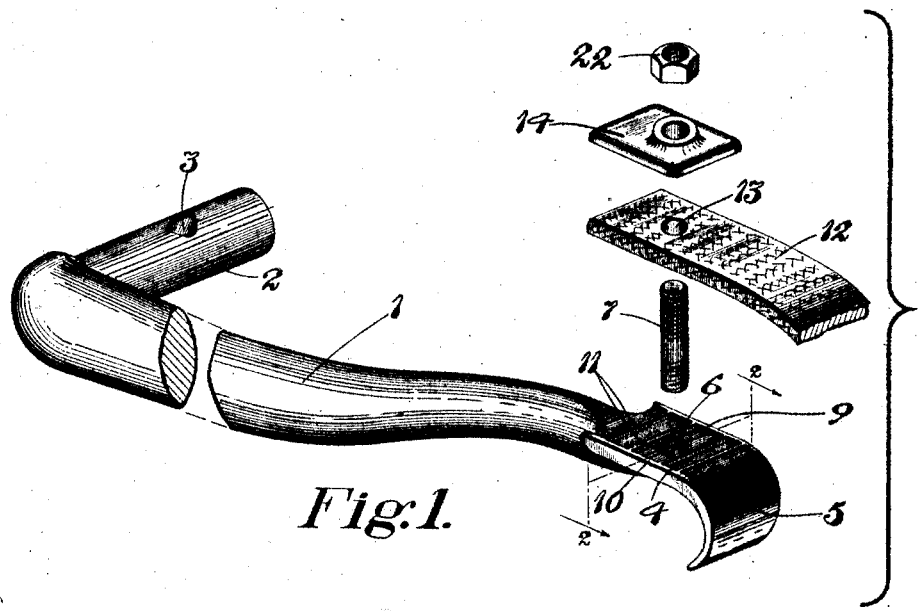
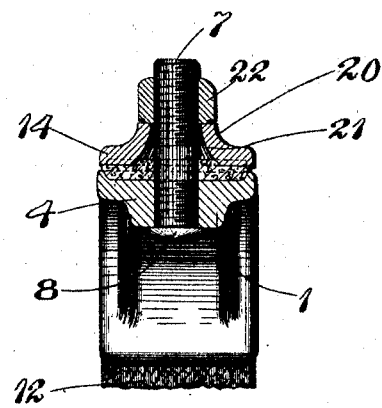
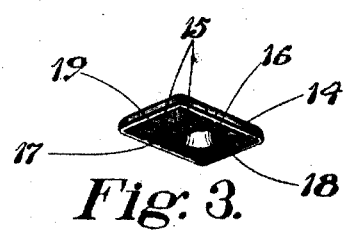
*Inventor—*
*Ralph M. Lovejoy.*
*By—Heard Smith & Tennant*
*Attorneys.*

Patented May 18, 1926.

1,584,957

UNITED STATES PATENT OFFICE.

RALPH M. LOVEJOY, OF MEREDITH, NEW HAMPSHIRE.

SHOCK-ABSORBER ARM AND CONNECTION.

Application filed June 5, 1922. Serial No. 565,885.

This invention relates to improvements in shock absorber arms and connections and the principal object thereof is to provide a shock absorber arm with means by which a strap may be securely connected to it and so constructed that the strap will not be damaged by its flexure which is occasioned by the oscillation of the shock absorber arm.

More particularly the invention relates to improvements in the shock absorber arm and connection disclosed in my prior Patent No. 1,324,913, granted December 16, 1919.

In that construction the shock absorber arm is illustrated as connected by a stud to the end of a rock shaft which extends through the shock absorber casing and is provided within the casing with an arm which is connected to the piston of the shock absorber. As disclosed in the aforesaid patent a separate clamp and guide for the strap is connected to the free end of the arm.

In the present construction the arm is provided with an integral flat strap-receiving seat which merges into a curved strap-flexing end portion. Means are provided for clamping the strap upon the seat and the strap passes therefrom over the strap-flexing portion. By reason of this construction a relatively inexpensive and more permanent construction is provided than that disclosed in my patent aforesaid.

A further object of the invention is to provide a novel means for preventing creeping of the strap and consequent tearing by the clamping means.

A further and important object of the invention is to provide means for preventing the spreading of the strap as it is clamped upon the strap-receiving seat.

A further object of the invention is to provide a novel form of clamping device which is more rigidly and permanently connected to the shock absorber arm and which comprises a minimum number of parts.

A further feature of the invention consists in providing a shock absorber arm with an integral rock shaft and also with an integral strap-receiving seat and strap-flexing means.

Other objects and features of the invention will more fully appear from the following description and accompanying drawing and will be pointed out in the claims.

A preferred embodiment of the invention is illustrated in the accompanying drawing as applied to a shock absorber arm for a hydraulic shock absorber such as that illustrated in my patent aforesaid.

In the drawing:

Fig. 1 is a perspective view of a preferred form of shock absorber arm showing also in perspective the members of the clamping mechanism and a portion of the strap in superimposed unassembled position;

Fig. 2 is a vertical sectional view on plane 2—2, Fig. 1, showing in assembled position the shock absorber arm, strap and clamping means;

Fig. 3 is an underneath perspective view of a preferred form of clamping plate.

The shock absorber arm illustrated in the accompanying drawing is particularly adapted for use in a hydraulic shock absorber of the character disclosed in my prior patent aforesaid and comprises an arm 1 of suitable length and preferably suitably curved to permit proper assemblage of the shock absorber and its connection upon the vehicle to which it is adapted, it being understood that the length, shape and curvature of the arm may be varied in accordance with the particular type of vehicle to which it is adapted.

The shock absorber arm 1 is provided at one end with a laterally extending integral rock shaft 2 which preferably is provided with an aperture 3 to receive a stud by which said rock shaft is connected to the interior arm of the shock absorber.

The outer or free end of the arm 1 is provided with a flat strap-receiving seat 4 which merges into a downwardly curved strap-flexing portion 5, the purpose of which will hereinafter be more fully described. The central portion of the strap-receiving seat is provided with a cylindrical aperture 6 having a screw threaded wall adapted to receive and engage the end of a stud 7. The stud 7 desirably passes through the shock absorber arm and its end 8 is riveted firmly against the under face of the arm thereby forming a permanent and rigid connection with the arm both by reason of the screw threaded engagement of the stud with the arm and the riveted end or head of the stud.

The strap-receiving seat desirably is provided with longitudinally extending ribs 9 and 10 which preferably are located at the margins of the seat. Desirably the strap-receiving seat is provided with a plurality of transversely extending ribs 11 which, as illustrated herein, extend across the seat between the marginal ribs 9 and 10. The form of the transverse ribs may be varied as the function of these ribs or projections is to indent and engage the face of the strap in such a manner as to prevent it from slipping or creeping upon the seat.

The strap 12, which forms the connection from the end of the shock absorber arm to the axle or spring of the vehicle, may be of any suitable material and preferably presents parallel flat surfaces. The strap 12 is provided near one end with an aperture 13 adapted to receive the stud 7, the aperture being placed at a sufficient distance from the end of the stud to enable the strap to extend the entire length of the seat 4.

Any suitable means may be provided for clamping the strap upon the strap-receiving seat A convenient means which is illustrated herein comprises a clamping plate 14 preferably of rectangular form corresponding substantially in shape and area to the shape and area of the clamp-receiving seat. The under face of the clamping plate 14 is provided with a series of projections, preferably transversely extending ribs 15, and is also desirably provided with longitudinally extending, preferably marginal, ribs 16 and 17 complementary to the ribs 9 and 10. The clamping plate desirably also is provided with similar end ribs 18 and 19.

Desirably the clamping plate has an upwardly extending boss 20 having a downwardly diverging inner wall 21 adapted to permit a slight tilting of the clamping plate relatively to the seat in event of unevenness of the thickness of the strap. The clamping plate is forced into clamping engagement by a nut 22 upon the stud 7.

In assembling the device the stud 7 is first screwed through the aperture 6 and its end hammered down to form a head 8. The strap is then applied to the strap seat by thrusting the stud 7 through the punched aperture 13 in the strap. The clamping plate is then applied and forced down upon the strap by the nut 22. By reason of the elasticity of the strap it is unnecessary to interpose a lock washer between the nut 22 and the boss 20 of the clamping plate or to use a lock nut upon the stud 7.

When the clamping plate is forced into clamping position the projections or ribs 11 and 15 upon the strap-receiving seat and the clamping plate are embedded into the material of the strap, while the longitudinal marginal edges or ribs 9 and 10 upon the strap-receiving seat, and 16 and 17 upon the clamping plate prevent lateral spreading of the strap. All of these ribs or projections which grip the strap serve to reduce the strain upon the stud and to prevent the strap from being torn by the stud. The curved end portion 5 of the arm serves to prevent the strap from being bent abruptly and thereby prevents chafing or shearing of the strap by the end of the shock absorber arm.

The shock absorber arm illustrated herein constitutes a distinct improvement over the shock absorber arm illustrated in my prior patent in that the arm 1 is formed integral with the rock shaft 2 and also in that its end is formed to present a strap-receiving seat terminating in a curved strap-flexing end portion. The construction is such that the arm can be completely constructed by drop-forging and thereby enables the production of a more uniform and rigid construction. Furthermore, the number of necessary parts is reduced and a cheaper, but more effective, construction provided.

It will be understood that the embodiment of the invention disclosed herein is illustrative and not restrictive and that various modifications in form, construction and arrangement of parts may be made within the spirit and scope of the claims.

Having thus described my invention, what I claim as new, and desire to secure by Letters Patent, is:

1. A shock absorber connection comprising an arm having an integral flat strap-receiving seat provided with transverse ribs and merging into a smooth curved strap-flexing end portion, a clamping plate having transverse ribs complementary to the ribs on said strap-receiving seat and means for clamping said plate upon said arm with a strap therebetween.

2. A shock absorber connection comprising an arm having an integral flat strap-receiving seat provided with strap-engaging projections and merging into a smooth curved strap-flexing end portion, a clamping plate complementary to the said clamp-receiving seat and means for clamping said plate upon said seat with the strap interposed therebetween 3. A shock absorber connection comprising an arm having a flat strap-receiving seat provided with longitudinally extending marginal ribs and transverse ribs and merging into a smooth curved strap-flexing end portion, a clamping plate having longitudinally extending marginal ribs and transverse ribs complementary to the ribs in said strap-receiving seat and means for forcing said clamping plate toward said strap-receiving seat with a strap interposed therebetween.

4. A shock absorber connection comprising an arm having an integral strap-receiving seat, a stud extending upwardly from said seat adapted to pass through an aperture in the strap, a clamping plate having a hollow boss surrounding said stud, the wall of the aperture of said boss diverging downwardly to permit tilting of the plate and a nut on said stud acting to clamp the clamping plate upon the strap-receiving seat with the strap therebetween.

5. A shock absorber connection comprising an arm having at one end a laterally extending integral rock shaft and at the other end an integral flattened portion presenting a transversely ribbed strap-receiving seat merging into a smooth curved strap-flexing end portion and means for clamping the strap upon said seat.

In testimony whereof I have signed my name to this specification.

RALPH M. LOVEJOY.